No. 842,217.  
PATENTED JAN. 29, 1907.  
A. H. MARKS.  
METHOD OF FORMING INNER TUBES FOR TIRES.  
APPLICATION FILED FEB. 15, 1905.

WITNESSES:  
INVENTOR  
BY  
Attorneys

UNITED STATES PATENT OFFICE.

ARTHUR HUDSON MARKS, OF AKRON, OHIO.

METHOD OF FORMING INNER TUBES FOR TIRES.

No. 842,217.  Specification of Letters Patent.  Patented Jan. 29, 1907.

Application filed February 15, 1905. Serial No. 245,783.

*To all whom it may concern:*

Be it known that I, ARTHUR HUDSON MARKS, a citizen of the United States, residing at Akron, in the county of Summit and State of Ohio, have invented certain new and useful Improvements in Methods of Forming Inner Tubes for Tires, of which the following is a specification.

This invention relates to an improved method of forming pneumatic tires, and particularly to inner tubes therefor; and the object is to provide an inner tube having vulcanized joints and a dense smooth inner surface.

With the above object in view the invention consists in the novel features of construction hereinafter fully described, particularly pointed out in the claims, and clearly illustrated by the accompanying drawings, in which—

Figure 1:
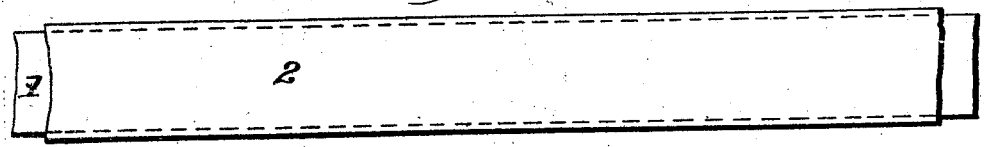
Figure 2:
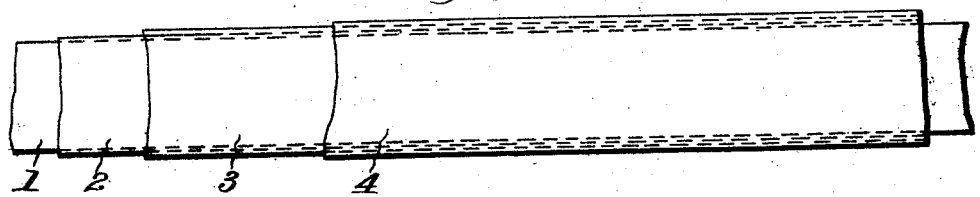
Figure 3:
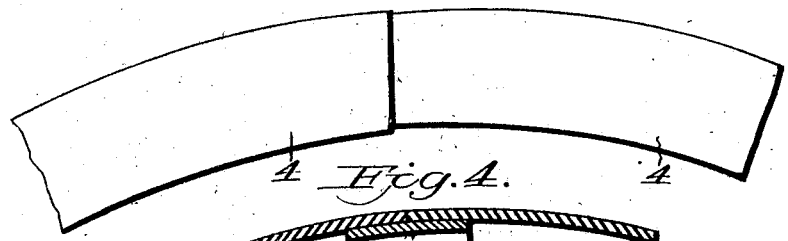
Figure 4:
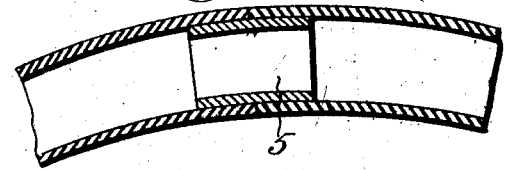
Figure 6:
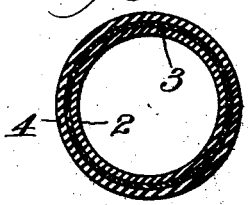
Figure 5:
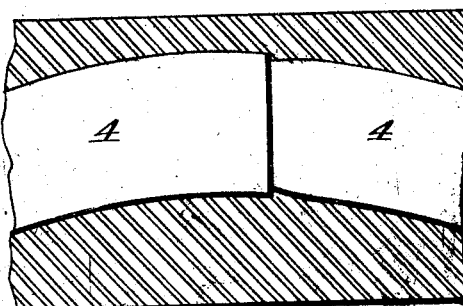

Figure 1 is a view showing a layer of rubber upon the mandrel about which it is wrapped; Fig. 2, a similar view showing several layers or plies upon the mandrel; Fig. 3, a view illustrating one method of joining the ends of the straight tube to form a continuous tube; Fig. 4, a similar view showing another method of uniting the ends of the tube; Fig. 5, a fragmentary sectional view of the mold, showing the tube therein; Fig. 6, a transverse sectional view of the tube.

Inner tubes for pneumatic tires as now manufactured are of two classes—the "wrapped" tube and the "molded" tube. The former is constructed by wrapping around a straight smooth steel mandrel sheets of rubber gum, then placing the whole within a vulcanizer and vulcanizing the same, after which the ends are brought together and cemented. The latter is constructed in the same manner, except that after the tube is formed on the mandrel it is removed therefrom and the ends brought together, after which it is placed in a mold and filled with hot air or steam and then vulcanized while still in the mold. In the first method described the tube has a smooth inner surface, but a cemented joint which is not durable. In the second method the tube has a vulcanized joint which is durable; but owing to the method of manufacture its inner surface is porous and in hard usage is inclined to split or crack.

The present invention is directed to the provision of an inner tube having a vulcanized joint, but at the same time a smooth dense inner surface, and it consists in wrapping about a straight mandrel 1 a ply or layer 2 of rubber compound so prepared or compounded as to vulcanize comparatively slowly. The whole is then placed in a vulcanizer and semivulcanized. This semivulcanization of the layer 2 while on the mandrel imparts to it a smooth dense inner surface and gives it sufficient strength and elasticity so that it can be handled without difficulty in proceeding with the remaining steps to complete the manufacture of the inner tube. After removing from the vulcanizer and drying the outer surface of layer 2 it is given while still on the mandrel a light coat 3 of vulcanizing rubber cement. A second layer or ply of rubber compound is then applied, and as many layers are used as may be necessary to form a tube of the desired thickness, a coating of rubber cement 3 being placed between each layer of rubber and its predecessor. The rubber compound of the second and succeeding layers, if any, is preferably such as will vulcanize in the same length of time as is required to complete the vulcanization of the semivulcanized inner ply or layer 2.

The second layer 4 is rolled carefully into good contact with the first layer at all points, and the tube thus formed by said layers is withdrawn from the mandrel and its ends brought together and joined either by telescoping one into the other, as illustrated in Fig. 3, or by bringing them into contact and joining with a bushing 5 of the same rubber compound, placed either inside or outside the tube. The tube in this condition is then placed in a mold and inflated with air or steam and the mold positioned in the vulcanizer and the tube vulcanized in the usual way, the result being that the close-grained inner surface secured by semivulcanizing the tube while upon the mandrel is retained in the finished tube, while at the same time a tube is provided in which the ends are joined by vulcanizing and not by cementing.

In order to secure a smooth dense inner surface, the tube must be vulcanized upon a mandrel, and to provide it with vulcanized joints it has heretofore been necessary to remove it from the mandrel before vulcanization, the latter operation being performed entirely after the ends are joined for vulcanizing. With my method the inner layer is vulcanized while upon the mandrel to a sufficient degree to make its inner surface smooth and close-grained and give it sufficient strength and elasticity to permit of its being handled during the remaining steps in the manufacture of a completed tube and at the same time permit of a further vulcanization to vulcanize the inner ends and complete the tube.

The tube may be formed of one or more layers, and if one layer is used the same, like layer 2, is formed of a rubber compound that will vulcanize slowly, so that it may be partially vulcanized upon the mandrel and then removed, its ends approximated, and the vulcanization completed, as hereinbefore described.

A retaining material, such as cloth, may be placed around the mandrel prior to the wrapping of the first layer of the rubber therearound instead of placing the rubber directly around the mandrel, as hereinbefore set forth.

Having thus fully described my invention, what I claim as new, and desire to secure by Letters Patent of the United States, is —

1. The improved method of forming inner tubes for pneumatic tires consisting in placing a slowly-vulcanizing rubber compound about a mandrel, partially vulcanizing the same while on the mandrel, then placing one or more layers of rubber compound so compounded as to vulcanize in the time necessary to complete the vulcanization of said inner layer upon the latter, then removing the tube thus formed from the mandrel, then approximating the ends of the tube, and finally vulcanizing the whole.

2. The improved method of forming inner tubes for pneumatic tires consisting in placing a layer of rubber compound about a mandrel wrapped with a retaining material, such as cloth, partially vulcanizing the same while on the mandrel, then removing from the mandrel, turning inside out, then approximating the ends of the tube, then placing in a mold, and finally completing the vulcanization.

3. The improved method of forming inner tubes for pneumatic tires consisting in placing a layer of rubber compound about a mandrel wrapped with a retaining material, such as cloth, partially vulcanizing the same while on the mandrel, then removing from the mandrel, turning inside out, then approximating the ends of the tube, then placing the tube in a mold, and finally completing the vulcanization.

In testimony whereof I affix my signature in presence of two witnesses.

ARTHUR HUDSON MARKS.

Witnesses:
J. L. MARSHALL,
H. A. MacKUSICK.